(12) United States Patent
Dandekar et al.

(10) Patent No.: US 8,195,653 B2
(45) Date of Patent: Jun. 5, 2012

(54) RELEVANCE IMPROVEMENTS FOR IMPLICIT LOCAL QUERIES

(75) Inventors: Nikhil Dandekar, Seattle, WA (US); Michael Cameron, Redmond, WA (US); Evan Despault, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 274 days.

(21) Appl. No.: 12/349,938

(22) Filed: Jan. 7, 2009

(65) Prior Publication Data

US 2010/0174703 A1 Jul. 8, 2010

(51) Int. Cl.
G06F 7/00 (2006.01)
G06F 17/30 (2006.01)
(52) U.S. Cl. ........................ 707/724; 707/759
(58) Field of Classification Search .................. 707/724, 707/759, 999.004
See application file for complete search history.

(56) References Cited

U.S. PATENT DOCUMENTS

| | | | |
|---|---|---|---|
| 7,152,061 B2 | 12/2006 | Curtis | |
| 7,739,266 B2* | 6/2010 | Riise et al. | 707/716 |
| 2005/0108244 A1* | 5/2005 | Riise et al. | 707/10 |
| 2006/0085392 A1 | 4/2006 | Wang | |
| 2007/0136295 A1 | 6/2007 | Gorodyansky | |
| 2007/0214131 A1* | 9/2007 | Cucerzan et al. | 707/5 |
| 2008/0005074 A1 | 1/2008 | Flake | |
| 2008/0005104 A1 | 1/2008 | Flake | |
| 2008/0065591 A1 | 3/2008 | Guzenda | |
| 2008/0168052 A1* | 7/2008 | Ott et al. | 707/5 |
| 2008/0222119 A1* | 9/2008 | Dai et al. | 707/4 |
| 2008/0243821 A1* | 10/2008 | Delli Santi et al. | 707/5 |
| 2009/0043749 A1* | 2/2009 | Garg et al. | 707/5 |

OTHER PUBLICATIONS

Categorizing Web Queries According to Geographical Locality http://www1.cs.columbia.edu/~gravano/Papers/2003/cikm03.pdf, 2003.
Detecting Dominant Locations from Search Queries http://research.microsoft.com/~xingx/QLD.pdf, 2005.
Location-based Spatial Queries http://www2.cse.ust.hk/faculty/dlee/Papers/mobile/sigmod-03-loc-based-spatial-q.pdf, 2003.
Yahoo Paper: Finding the Local "Center" of Search Queries http://searchengineland.com/080428-061418.php, Sep. 29, 2008.

* cited by examiner

Primary Examiner — Kimberly Wilson
(74) Attorney, Agent, or Firm — Shook, Hardy & Bacon L.L.P.

(57) ABSTRACT

Computer systems, methods, and media improving the relevance of the search results presented to a user for queries having an implicit local intent are provided. Utilizing the systems and methods described herein locally-biased queries are identified, despite such queries being void of any location-specific terms. A location of a computing device associated with the user is determined and localized web search results associated with the data item pair comprising the input query and the user's determined location are generated and presented to the user.

20 Claims, 5 Drawing Sheets

US 8,195,653 B2

RELEVANCE IMPROVEMENTS FOR IMPLICIT LOCAL QUERIES

BACKGROUND

Conventional search engines rank search results based on criteria such as the frequency of terms within a website that match the terms included in a received search query. The results are ranked independent of a user's specific location, unless a location-specific term is included in the query. That is, conventional search engines return the same results regardless of the user's search location within a country. For instance, a conventional search engine responding to the query "car wash" may return the uniform resource locator for an article about the history of automated car washes as the highest-ranking result for a user in Seattle, New York, or anywhere in the United States of America. However, a user in Seattle who enters the query "car wash" is most likely interested in finding a car wash in or near Seattle. Similarly, a user in any other location is most likely interested in car wash establishments near that particular location, rather than the article about the history of automated car washes.

SUMMARY

Embodiments of the present invention generally relate to systems and methods for improving the relevance of the search results presented to a user for queries having an implicit local intent. Utilizing the systems and methods described herein locally-biased queries are identified, despite such queries being void of any location-specific terms. A location of a computing device associated with the user is determined and localized web search results associated with the data item pair comprising the input query and the user's determined location are generated and presented to the user.

This Summary is provided to introduce a selection of concepts in a simplified form. The selection of concepts is further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
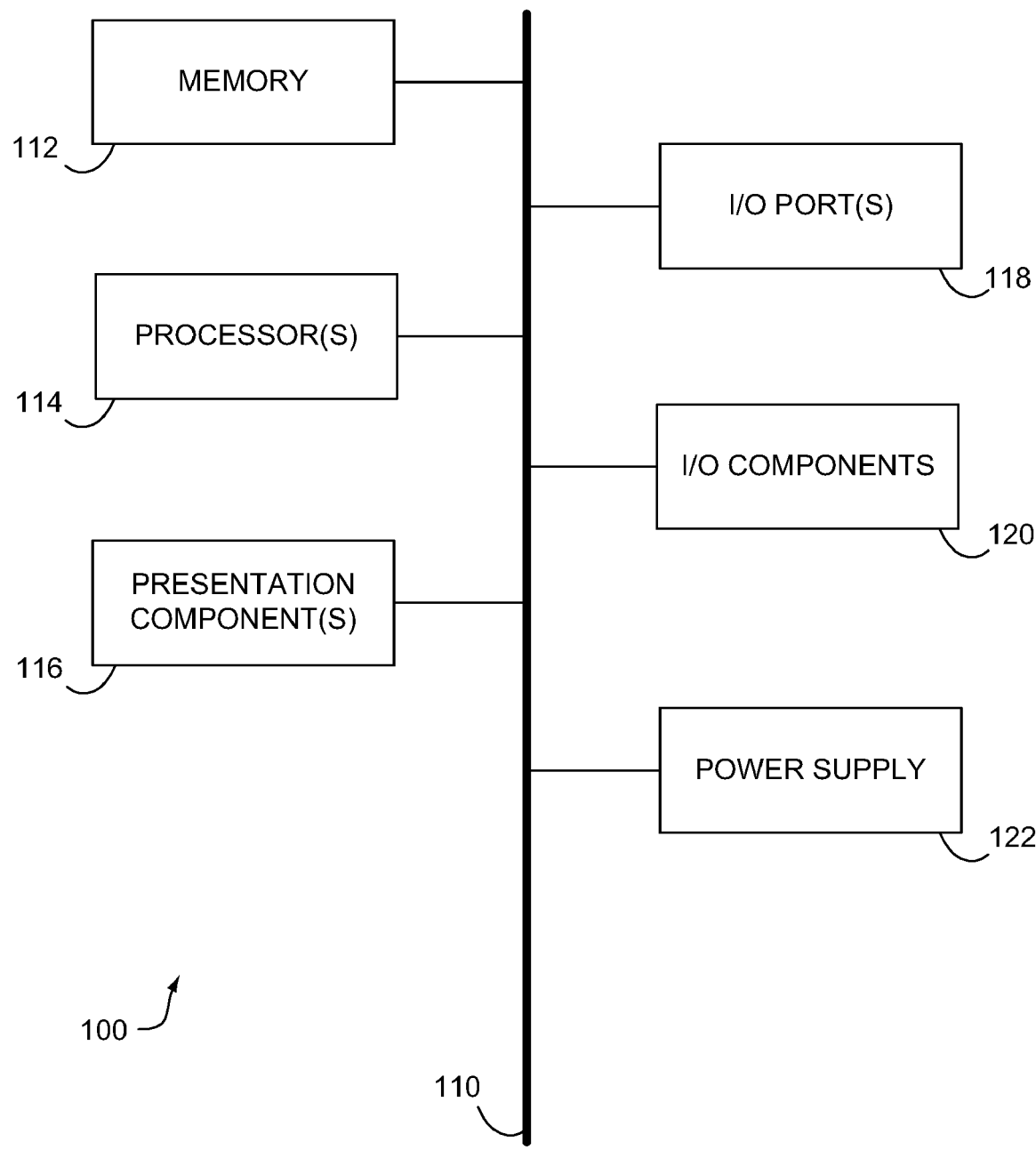
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, embodiments of the present invention are described in detail below with reference to the attached drawing figures, which are incorporated in their entirety by reference herein.

Embodiments of the present invention provide systems and methods for improving the relevance of search results determined to satisfy search queries having an implicit local bias, that is, implicit local queries. As utilized herein, the term "implicit local query" refers to a search query for which the user is interested in search results relevant to the user's geographic search location, despite the query as input by the user being void of any explicit information about the user's search location.

Accordingly, in one embodiment, the present invention is directed to a computer-implemented method for generating localized search results for user queries having implicit local intent. The method includes receiving a query from a user, determining a location of a computing device associated with the user, and utilizing both the query and the computing device location to determine if an implicit local intent is present. Upon determining that an implicit local intent is present, the method further includes utilizing a search engine to determine at least one local, location-specific result for the received query and presenting the at least one local, location-specific result for the received query.

In another embodiment, the present invention is directed to one or more computer-storage media having computer-executable instructions embodied thereon for performing a method for improving search result relevance for search queries having implicit local intent. The method includes receiving a query void of explicit local intent from a user, determining a location of a computing device associated with the user utilizing an Internet Protocol (IP) address associated with the computing device, and utilizing both the query and the computing device's location to determine if an implicit local intent is present. Upon determining that an implicit local intent is present, the method further includes utilizing a search engine to determine at least one local, location-specific result for the received query, determining at least one result for the received query determined without regard to the computing device's location, and presenting the at least one local, location-specific result and the at least one result determined without regard to the computing devices location.

In yet another embodiment, the present invention is directed to one or more computer-storage media having computer-executable instructions embodied thereon for performing a method for improving the relevance of search results for implicit local queries. The method includes receiving a query void of explicit local intent from a user, and receiving an Internet Protocol (IP) address associated with a computing device associated with the user, wherein the IP address is indicative of a geographic region associated with the computing device. The method further includes receiving query log data comprising at least one of session data, session data with locations, query location data and click data compiled based upon a plurality of users, and utilizing the query log data to determine if an implicit local intent is present in the received query, wherein an implicit local intent is determined to be present when at least one term having an explicit local intent is commonly added to the received query upon a subsequent query being received from users having computing devices associated with IP addresses associated with the geographic region. Upon determining that an implicit local intent is present, the method further comprises utilizing at least one of a search engine or the query log data to determine at least one local, location-specific result for the received query and presenting the at least one local, location-specific result for the received query.

Having briefly described an overview of the present invention, an exemplary operating environment in which various aspects of the present invention may be implemented is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as the memory 112 or the I/O components 120. The presentation component(s) 116 present data indications to a user or other device. Exemplary presentation components include a display device, speaker, printing component, vibrating component, etc.

I/O ports 118 allow the computing device 100 to be logically coupled to other devices including the I/O components 120, some of which may be built in. Illustrative components 120 include a microphone, joystick, game pad, satellite dish, scanner, printer, wireless device, etc.

Figure 2:
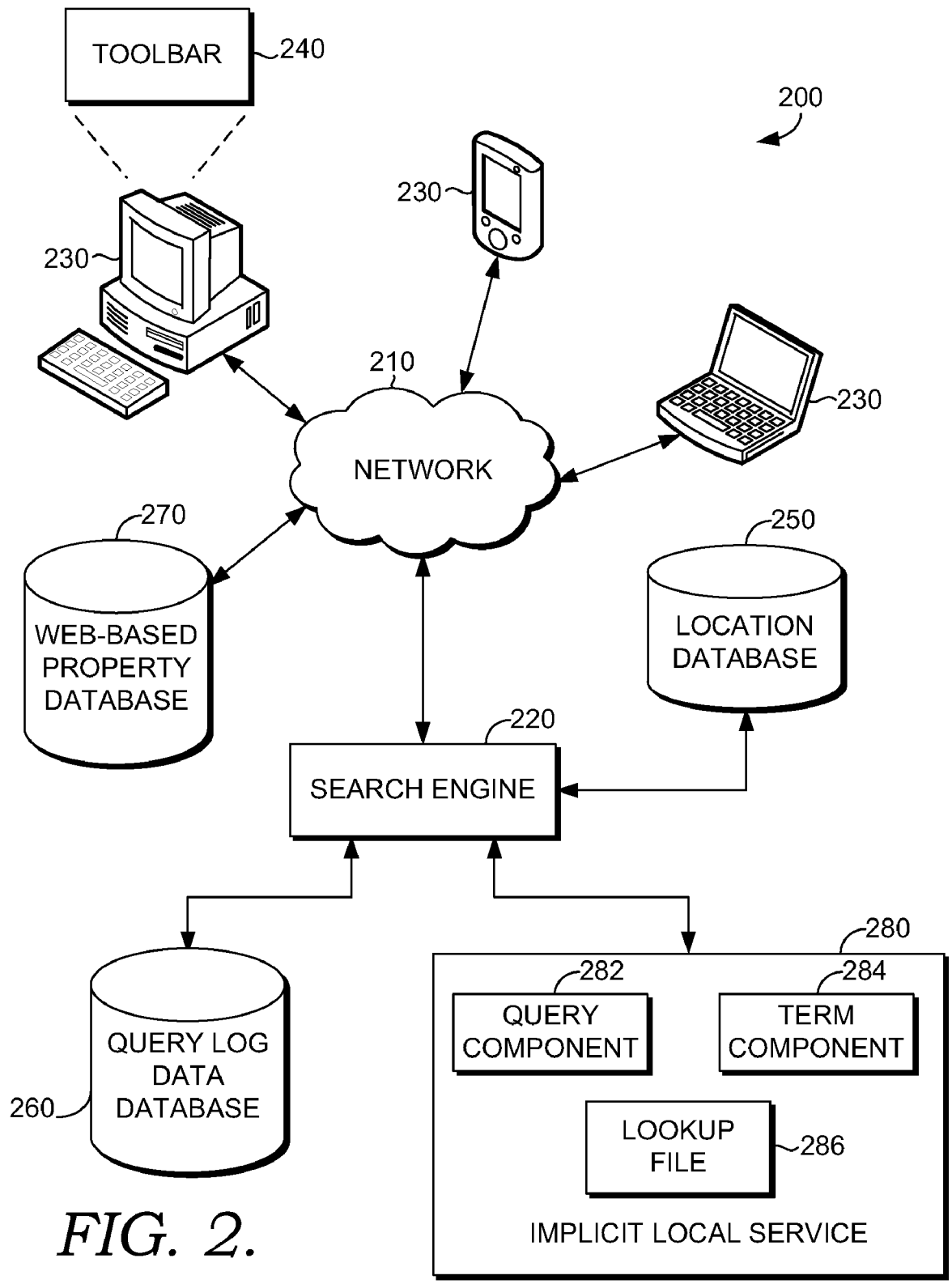
FIG. 2 is a schematic diagram of an exemplary network operating environment suitable for use in implementing embodiments of the present invention.

As previously stated, embodiments of the present invention provide systems and methods for improving the relevance of search results determined to satisfy search queries having an implicit local bias, that is, implicit local queries. Turning to FIG. 2, an exemplary operating environment for implementing embodiments of the present invention is shown and designated generally as computing environment 200. Computing environment 200 is but one example of a suitable computing environment and is not intended to suggest any limitation as to the scope of use or functionality of embodiments of the invention. Neither should the computing environment 200 be interpreted as having any dependency or requirement relating to any one or combination of components illustrated. As utilized herein, the term "component" refers to any combination of hardware, software, or firmware.

With continued reference to FIG. 2, the operating environment 200 includes a network 210, a search engine 220, a plurality of client devices 230 (which may be, for instance, computing device 100 of FIG. 1), a location database 250, a query log data database 260, a web-based property database 270, and an implicit local service 280.

As used herein, "web-based properties" are documents that represent HyperText Markup Language pages or other content. Web-based properties may be addressed using Uniform Resource Locators (URLs) and may include anchors that link to other web-based properties or additional content. In an embodiment, the web-based properties may be formatted in extensible markup language or any other markup language.

The network 210 is configured to facilitate communication between the client devices 230 and the search engine 220. The network 210 may be a communication network, such as a wireless network, local area network, wired network, or the Internet. In an embodiment, the client devices 230 communicate search queries received from one of the plurality of client devices 230 to the search engine 220 utilizing the network 210. Similarly, in embodiments, the search engine 220 communicates search results satisfying a received search query to one or more of the plurality of client devices 230 via the network 210.

The search engine 220 is a computing device that receives user search queries, determines search results satisfying the user search queries received and transmits determined satisfying search results to the client devices 230 (e.g., utilizing network 210). In some embodiments, the search engine 220 is configured to execute on a server device. The search engine 220 may receive search queries input in associated with at least one of the client devices 230 (for instance, via network 210). The received search queries may be processed by the search engine 220 to identify web-based properties that satisfy the received search queries, for instance, that match terms included in the received search queries. In turn, the search engine 220 may transmit search results that include those web-based properties determined to satisfy the search queries received from the client devices 230. Additionally, the search engine 220 may be configured to query the location database 250 to identify a location for the client device 230 that transmitted a received search query to the search engine 220.

In certain embodiments, the client devices 230 may transmit user activity logs, such as, but not limited to, tool bar logs, to the search engine 220 (e.g., utilizing network 210). The search toolbar 240 is a utility that may be associated with one or more of the client devices 230. In embodiments, the search toolbar 240 may be utilized to log and track the user's visits to web-based properties, may submit the user activity logs having web-based properties visited by the user to the search engine 220 (for instance, utilizing network 210), and may submit an Internet Protocol (IP) address of the client devices 230 to the search engine 220 (again, e.g., utilizing network 210). In certain embodiments, the search toolbar 240 may be a component of the user's web browser that logs browse activity for every web-based property that the user visits. Essentially, the user activity logs identify each web-based property that the user visits, the user's IP address, and other important browse activity. The user activity logs received from the client devices 230 may be used by the search engine 220 to identify a location associated with a computing device associated with a user, to identify locations for web-based properties, and to impact a rank of web-based properties satisfying user search queries in accordance with analysis performed by the search engine 220.

The location database 250 is a database that stores location data for web-based properties and users, for instance, utilizing the location of a computing device associated with the user. In some embodiments, the location database includes a lookup table having location data and IP address data. For each URL, web-based property, and IP address, the lookup table may include a corresponding location. The location may specify the country, state, city, county, municipality, or any other geographic location identifier for a web-based property having the specified URL. The lookup table may further include entries having an IP address and corresponding location information. For instance, the lookup table may store the URL "www.va.com.au" having IP address 130.194.1.99 that corresponds to a computing device located in Clayton, Victoria, Australia. The location database 250 is configured to receive a user's IP address (that is, an IP address associated with the user's computing device) and/or web-based property URL (e.g., from search engine 220) and return the location for the web-based property or the user based on an IP address and/or URL received.

The query log data database 260 is configured to store browse activity, such as query-click activity as indicated by the search engine 220. The query-click activity may include records of queries that users issue to the search engine 220, records of the time a query was issued, and records of clicks (selections) a user initiates on search results. Additionally, the query log data database 260 may store the browse activity collected from the search toolbar 240, along with information regarding which user issued the query in the form of a unique identifier such as the IP address of a computing device 230 associated with the user. The toolbar logs from the client devices 230 may also be stored in association with the query log data database 260. As more fully described below, from the query log data database 260, various data sources may be extracted and used in analyses performed by the search engine 220.

Exemplary data sources extracted from query log data database 260 may include session data, session data with locations, query location data and click (selection) data. Session data identifies pairs of queries [$q_1$, $q_2$] where users frequently issue $q_2$ within a predefined time period as a follow-up query after issuing the query $q_1$. For instance, a session data entry may indicate that users went from the query "bus" to the query "bus Seattle" in the same session 5,000 times.

Session data with locations couples session data with the locations of the users issuing the session queries. For instance, an entry may indicate that users from Seattle, Wash. (identified based upon, e.g., the IP address of the users' computing devices) went from the query "bus" to the query "bus Seattle" in the same session 1,000 times.

Query location data stores the query, the location from which it was issued, and the number of times it was issued from that location. For example, an entry may indicate that a user issued the query "bus Seattle" from location Seattle, Wash. 10,000 times.

Click (selection) data includes the URLs of the results that users most often selected for particular search queries. For example, an entry may show that for the query "bus Seattle," the most selected URL was "http://transit.metrokc.gov" and the second most selected URL was "http://www.seattle.gov./html/citizen/bus.htm", etc.

As shown in FIG. 1, the search engine 220 is configured with an implicit local service 280. The implicit local service 280 is configured to generate localized URLs for the pair of data items including the received search query and the user's location (identified based upon a computing devices IP address) based on the query log data received from query log data database 260. The implicit local service 280 comprises a query component 282, a term component 284 and a lookup file component 286.

The query component 282 is configured to identify queries which are disproportionately popular at particular locations. In this regard, the query component 282 utilizes query location data from the query log data to calculate the probability of a query originating from a particular location. Additionally, the query component 282 may be further configured to utilize the query log data to determine the expected distribution of all queries issued from a particular location. Further, the query component 282 may perform a statistical analysis to determine the Kullback-Leibler (KL) divergence between the observed and expected probabilities of a query originating from a particular location.

In this regard, the query component 282 may be configured to calculate the KL divergence to find queries that are disproportionately popular at a specified location:

$$KL(Q, L) = P(Q, L) \cdot \log\left(\frac{P(Q, L)}{E(L)}\right).$$

Wherein "Q" represents a query, "L" represents a location, "P(Q, L)" represents the probability that a user is entering a query "Q" from location "L," and "E(L)" represents the expected distribution of all queries issued from a location "L." The query component 282 is then configured to analyze the query log data to calculate P(Q, L) and E(L). The query component 282 is configured to utilize the query log data to identify for each query "Q," a location "L" where the query "Q" is highly popular. The query component 282 is then configured to calculate the number of users who issued the query "Q" from each location "L" based on the query log data and location information provided by the location database 250. For example, if the query log data and location information indicates the query "bus Seattle" is issued 8 times from Seattle, Wash. and 2 times from Bellevue, Wash., the value of P(Q=bus seattle, L=Seattle, Wash.) equals 0.8. Furthermore, if 2% of all queries are issued from Seattle, Wash., the E(L=Seattle)=0.02.

In turn, the query component 282, is configured to calculate the following KL divergence value for the query "bus Seattle" from Seattle, Wash.:

$$KL(Q=\text{bus Seattle}, L=\text{Seattle})=0.8* \log(0.8/0.02)= 2.95.$$

After evaluating KL("bus seattle", Seattle) the query component 282 may be configured to compare the KL divergence value to a predefined threshold value, such as 0.25, to determine whether the query is locally biased toward a particular location. A high KL divergence value indicates that the query "bus Seattle" is unusually popular in this location (Seattle, Wash.).

The term component 284 is configured to identify a list of common terms that users in particular locations add to queries when issuing a subsequent query within a predefined time period, such that it appears that the originally input query did not return specific enough results to satisfy the user. In this regard, the term component 284 is configured to analyze 'session data with locations' entries from the query log data to determine the number of times a particular term was added to a query received at a particular location, as identified by the location information provided by the location database 250. In certain embodiments, the term component 284 is configured to determine the number of instances users from location "L" went from a query "Q" to the query "Q+T" or "T+Q" in the same session, where "T" represents a term. For example, the query log data and location information may indicate that users in Seattle, Wash. went from the query "bus" (Q), to the follow-up query "bus Seattle" (Q+T) in the same session 1000 times, where "T" equals "Seattle." The term component 284 may also be configured to determine the total number of times the term "T" was added across all queries in the particular location. For example, the term component 284 may find that the term "Seattle" was added across all queries at location Seattle, Wash. 20,000 times, and the term "free" was added to all queries in Seattle, Wash. 30,000 times.

Additionally, the term component 284 may be configured to perform a statistical analysis using the Kullback-Leibler (KL) divergence technique to identify terms that are added to queries more often in a particular location "L" than other locations. The term component 284 thus may be configured to calculate the KL divergence values for terms commonly added to queries using the same statistical divergence measure described for the query component 282, but with query "Q" replaced with added term "T." Therefore, the term component 284 may determine KL(T,L) for a particular added term at a particular location. After evaluating the KL divergence the query component 282 may compare the KL divergence value to a threshold value, such as 0.25, to determine whether the added term "T" is locally biased toward a particular location. A high KL divergence value indicates that the added term is unusually popular in a particular location. Thus for every location, the term component 284 may determine a list of terms that users commonly add to their queries which are locally biased. Exemplary added terms may include, but are not limited to, terms that describe geographical locations, businesses, tourist attractions, or local areas at or near the user's location. For example, the term component 284 may determine that for location "Seattle, Washington", the locally biased terms which users most commonly add to their queries are: "Seattle", "Washington", "King County", or the like.

The lookup file component 286 is configured to generate a list of localized URLs associated with a query and user's location (as evidenced by the location of a computing device associated with the user). In this regard, for every query "Q" received by search engine 220 from a user in location "L", the lookup file component 286 is configured to utilize the list of common terms that users in particular locations add to queries from term component 284, to construct a list of enhanced queries ($E_1=Q+T_1$, $E_2=Q+T_2$, $E_3=Q+T_3$) based on the entered query "Q". For instance, if the query "bus" is issued from a user in "Seattle, Washington", the lookup file component 286 may be configured to use the output from the term component 284, to construct a list of enhanced queries ($E_1$, $E_2$, $E_3$), for instance, "bus Seattle", "bus Washington", "King County bus", etc. The lookup file component 286 may then be configured to select from the list of enhanced queries, only those enhanced queries which have been issued by users in the past and are locally biased towards the user's location determined using the query component 282. For instance, the lookup file component 286 may determine that queries "bus Seattle" and "King County bus" are the enhanced queries which have been issued by users in the past, as indicated by the query log data, and are thus locally biased towards Seattle, Wash.

The lookup file component 286 is further configured to use click data from the query log data to determine the most clicked on or selected URLs for each of the selected enhanced queries. Additionally, the lookup file component 286 may be configured to rank the URLs, for instance:

$$\text{rank}_{url}=n^2 \cdot (c) \cdot \log(kl).$$

Wherein "n" represents the number of unique queries pointing to the URL, "c" represents the average click data score over all the queries pointing to this URL, and "kl" represents the average KL divergence score over all the queries pointing to this URL. After determining the top-ranked selected URLs for the selected enhanced queries ($E_1$, $E_3$), the lookup file component 286 may be configured to create a look up file, which associates the original query (Q) and user's location (L) with the top ranked URLs. For example, using the above ranking formula, the lookup file component 286 may determine that the three top ranked click URLs for queries "bus seattle" and "king county bus" are http://transit.metrokc.gov/, http://www.seattle.gov/html/citizen/bus.htm, and http://www.everettwa.org/default.apsx?ID=291. Accordingly, for a data item pair comprising a received query and a user's location of query "bus" and user's location "Seattle, Washington", the lookup file component 286 would create a lookup file which associates the pair with the three URLs http://transit.metrokc.gov/, http://www.seattle.gov/html/citizen/bus.htm, and http://www.everettwa.org/default.apsx?ID=291.

In an embodiment, the search engine 220 may be configured to use the lookup file generated by the lookup file component 286 to extract the top localized URLs for a query and present the localized URLs merged with regular search results, that is, search results determined without regard to the user's location, in association with the client devices 230. The localized URLs may be presented on a client device 230 is a variety of configurations. For example, the localized URLs may be presented at set positions in the search results, at the top of the search page as the first set of results, or at the bottom of the search page as the last set of results. Alternatively, the search page can be split explicitly at a certain location and the localized URLs presented with a message notifying the users of the reason for the split. For instance, the top three localized URLS for a query may be presented as the top three search results with an explicit split on the results page and a message "Results for query "bus" near Seattle, Washington."

One of ordinary skill in the art understands and appreciates the computing environment 200 has been simplified for description purposes and alternate operating environments are within the scope and spirit of the above description.

Figure 3:
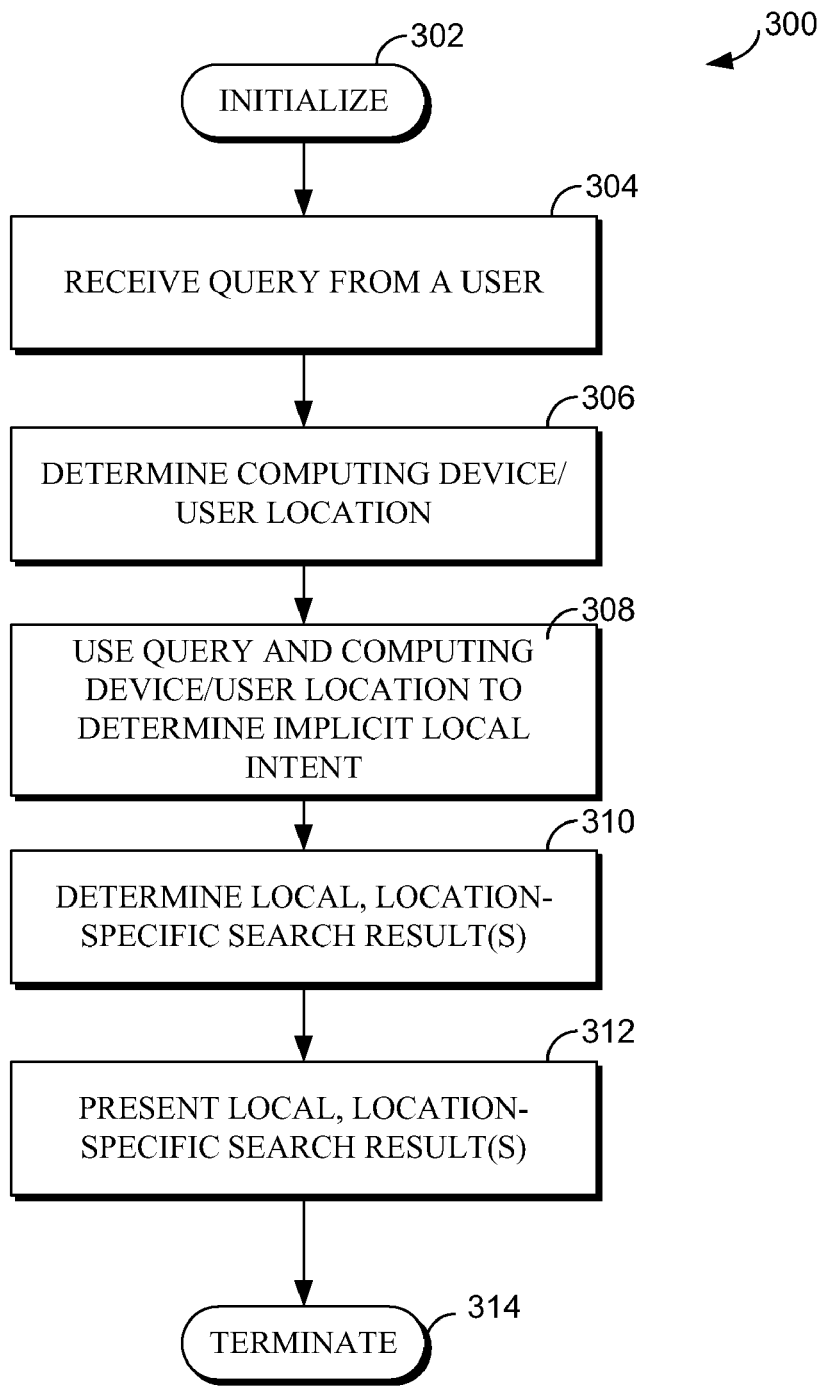
FIG. 3 is a flow diagram illustrating a method for generating localized search results for queries having implicit local intent, in accordance with an embodiment of the present invention.

Turning to FIG. 3, a flow diagram is illustrated showing a method 300 for generating localized search results for queries having implicit local intent, in accordance with an embodiment of the present invention. The computer-implemented method initiates at step 302. At step 304, a search query is received from a user, for instance, utilizing one of computing devices 230 of FIG. 2. At step 306, a location of a computing device associated with the user is determined, for instance, by identifying the Internet Protocol (IP) address associated with the computing device. The location of the computing device is treated as corresponding to the location of the user. At step 308, both the received query and the computing device/user's location are utilized to determine if an implicit local intent is present. Upon determining that an implicit local intent is present, at step 310, a search engine (e.g., search engine 220 of FIG. 2) is utilized to determine at least one local, location-specific search result for the received query. At step 312, the at least one local-location-specific search result is presented, for instance, in association with the user's computing device. The computer-implemented method terminates at step 314.

Figure 4:
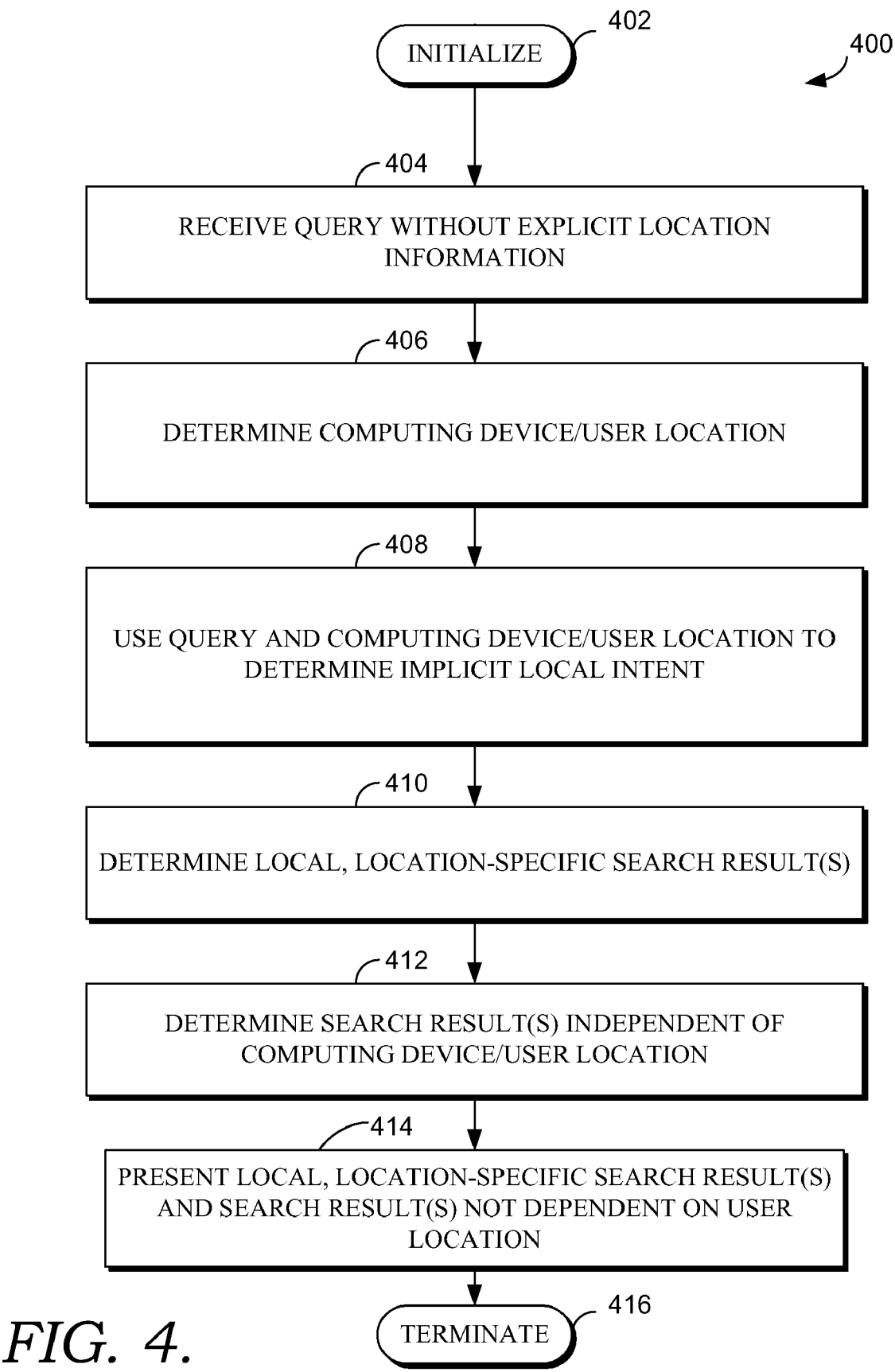
FIG. 4 is a flow diagram illustrating a method for generating localized search results for queries having implicit local intent, in accordance with an embodiment of the present invention.

With reference to FIG. 4, a flow diagram is illustrated showing a method 400 for generating localized search results for queries having implicit local intent, in accordance with an embodiment of the present invention. The computer-implemented method initiates at step 402. At step 404, a search query void of explicit local intent is received from a user, for instance, utilizing one of computing devices 230 of FIG. 2. At step 406, a location of a computing device associated with the user is determined, for instance, utilizing the Internet Protocol (IP) address associated with the computing device. The location of the computing device is subsequently treated as corresponding to the location of the user. At step 408, both the received query and the computing device/user's location are utilized to determine if an implicit local intent is present. Upon determining that an implicit local intent is present, at step 410, a search engine (for instance search engine 220 of FIG. 2) is utilized to determine at least one local, location-specific search result for the received query. At step 412, at least one search result for the received query is determined without regard to the computing device/user's location. At step 414, both the local, location-specific search result(s) and the search result(s) determined without regard to the computing device/user's location are presented, for instance, in association with the user's computing device. The computer-implemented method terminates at step 416.

Figure 5:
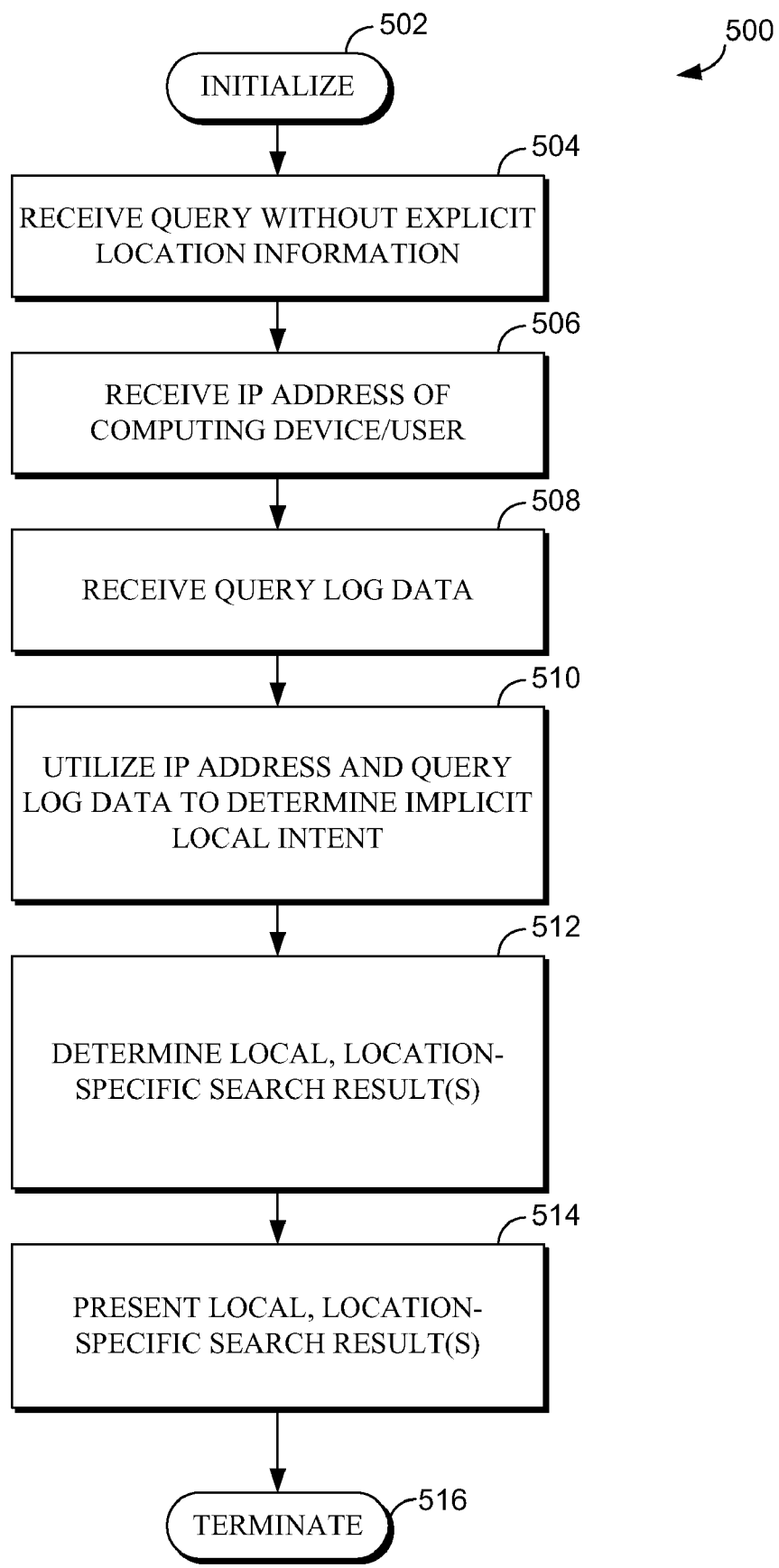
FIG. 5 is a flow diagram illustrating a method for improving the relevance of the search results returned engine for queries having an implicit local intent, in accordance with an embodiment of the present invention.

Referring now to FIG. 5, a flow diagram is illustrated showing a method 500 for improving the relevance of the search results returned engine for queries having an implicit local intent, in accordance with an embodiment of the present invention The computer-implemented method initiates at step 502. At step 504, a search query void of explicit local intent is received from a user, for instance, utilizing one of computing devices 230 of FIG. 2. At step 506, an Internet Protocol (IP) address associated with a computing device associated with the user is received, wherein the IP address is indicative of a geographic region associated with the computing device. The location of the computing device is subsequently treated as corresponding to the location of the user. At step 508, query log data comprising at least one of session data, session data with locations, query location data, and click (selection) data compiled based upon a plurality of users is received. At step 510, the IP address and the query log data are utilized to determine if an implicit local intent is present in the received query. A implicit local intent is determined to be present when at least one term having an explicit local intent is commonly added to the received query upon a subsequent query being received from users having computing devices associated with IP addresses associated with the geographic region. Upon determining that an implicit local intent is present, at step 512, a search engine (e.g., search engine 220 of FIG. 2) is utilized to determine at least one local, location-specific search result for the received query. At step 514, the local, location-specific result(s) are presented to the user, for instance, in association with the user's computing device. The computer-implemented method terminates at step 516.

As can be understood, embodiments of the present invention relate to systems and methods for improving the relevance of the search results presented to a user for queries having an implicit local intent. Utilizing the systems and methods described herein locally-biased queries are identified, despite such queries being void of any location-specific terms. A location of a computing device associated with the user is determined and localized web search results associated with the data item pair comprising the input query and the user's determined location are generated and presented to the user.

The foregoing descriptions of the invention are illustrative, and modifications in configuration and implementation will occur to persons skilled in the art. For instance, while the present invention has generally been described with relation to FIGS. 1-5, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

Having thus described the invention, what is claimed is:

1. A computer-implemented method for generating localized search results for user queries having implicit local intent, the method comprising:
   receiving a query from a user;
   determining a location of a computing device associated with the user;
   utilizing the query, the location of the computing device, and historical query-click activity from users in the location of the computing device to determine if an implicit local intent is present;
   calculating a statistical divergence value based on observed and expected probabilities of the query historically originating from the location, wherein the observed and expected probabilities are based on query log data for the location;

based on the implicit local intent being present and based on the statistical divergence value, determining at least one local, location-specific result for the query; and
presenting the at least one local, location-specific result for the query.

2. The computer-implemented method of claim 1, wherein receiving a query from a user comprises receiving a query void of explicit local intent.

3. The computer-implemented method of claim 2,
wherein determining the location of the computing device associated with the user further comprises identifying a geographic region associated with an IP address associated with the computing device
and wherein utilizing both the query and the computing device's location to determine if an implicit local intent is present comprises utilizing the search engine to determine if at least one term having an explicit local intent is commonly added to the received query upon a subsequent query being received from users associated with computing devices having IP addresses associated with the geographic region.

4. The computer-implemented method of claim 3, wherein the at least one term having an explicit local intent comprises at least one term indicative of at least one of a geographical location, a business, a tourist attraction, or a local area at or near the geographic region.

5. The computer-implemented method of claim 4, wherein utilizing both the query and the computing device's location to determine if an implicit local intent is present further comprises generating an enhanced query utilizing the at least one term having an explicit local intent.

6. The computer-implemented method of claim 5, wherein utilizing a search engine to determine at least one local, location-specific result for the received query comprises utilizing a search engine to identify at least one frequently selected Uniform Resource Locator (URL) generated based upon the enhanced query, the at least one frequently selected URL being frequently selected upon the subsequent query being received from users having computing devices associated with IP addresses associated with the geographic region.

7. The computer-implemented method of claim 1, wherein determining a location of a computing device associated with the user comprises identifying an Internet Protocol (IP) address associated with the computing device.

8. The computer-implemented method of claim 1, wherein utilizing both the query and the computing device's location to determine if an implicit local intent is present comprises accessing query log data compiled for a plurality of users.

9. The computer-implemented method of claim 8, wherein the query log data includes at least one of session data, session data with locations, query location data, and click data.

10. The computer-implemented method of claim 1, wherein presenting the at least one local, location-specific result for the received query comprises presenting the at least one local, location-specific result and at least one result determined without regard to the computing device's location.

11. One or more computer-storage memory having computer-executable instructions embodied thereon for performing a method for improving search result relevance for search queries having implicit local intent, the method comprising:
receiving a query void of explicit local intent from a user;
determining a location of a computing device associated with the user utilizing an Internet Protocol (IP) address associated with the computing device;
utilizing the query, the location of the computing device, and historical query-click activity from users in the location of the computing device to determine if an implicit local intent is present;
calculating a statistical divergence value based on observed and expected probabilities of the query historically originating from the location, wherein the observed and expected probabilities are based on query log data for the location;
based on the implicit local intent being present and based on the statistical divergence value, determining at least one local, location-specific result for the query; and
determining at least one result for the received query determined without regard to the computing device's location; and
presenting the at least one local, location-specific result and the at least one result determined without regard to the computing device's location.

12. The one or more computer-storage memory of claim 11,
wherein utilizing a search engine to determine the location of the user further comprises identifying a geographic region associated with the computing device's IP address,
and wherein utilizing both the query and the computing device's location to determine if an implicit local intent is present comprises utilizing the search engine to determine if at least one term having an explicit local intent is commonly added to the received query upon a subsequent query being received from users having computing devices associated with IP addresses associated with the geographic region.

13. The one or more computer-storage memory of claim 12, wherein the at least one term having an explicit local intent comprises at least one term indicative of at least one of a geographical location, a business, a tourist attraction, or a local area at or near the geographic region.

14. The one or more computer-storage memory of claim 11, wherein utilizing both the query and the computing device's location to determine if an implicit local intent is present comprises accessing query log data compiled for a plurality of users.

15. The one or more computer-storage memory of claim 14, wherein the query log data includes at least one of session data, session data with locations, query location data, and click data.

16. The one or more computer-storage memory of claim 11, wherein presenting the at least one local, location-specific result and the at least one result determined without regard to the computing device's location comprises displaying the at least one local, location-specific result in association with a first area of a user interface and displaying the at least one result determined without regard to the computing device's location in association with a second area of a user interface.

17. The one or more computer-storage memory of claim 11, wherein presenting the at least one local, location-specific result and the at least one result determined without regard to the computing device's location comprises presenting a local result identifier in association with the at least one local, location-specific result.

18. One or more computer-storage memory having computer-executable instructions embodied thereon for performing a method for improving the relevance of search results for implicit local queries, the method comprising:
receiving a query void of explicit local intent from a user;
receiving an Internet Protocol (IP) address associated with a computing device associated with the user, wherein the IP address is indicative of a geographic region associated with the computing device;

receiving query log data comprising at least one of session data, session data with locations, query location data and click data compiled based upon a plurality of users;

receiving session data extracted from query logs, the session data comprising pairs of queries that include an initial query and a secondary query, wherein the secondary query is a follow-up query a user has issued within a predetermined period of time after issuing the initial query;

utilizing the received IP address, the query log data, and the session data to determine if an implicit local intent is present in the received query, wherein an implicit local intent is determined to be present when at least one term having an explicit local intent is commonly added to the received query upon a subsequent query being received from users having computing devices associated with IP addresses associated with the geographic region;

calculating a statistical divergence value based on observed and expected probabilities of the query historically originating from the location, wherein the observed and expected probabilities are based on query log data for the location;

based on the implicit local intent being present and based on the statistical divergence value, determining at least one local, location-specific result for the query; and presenting the at least one local, location-specific result for the received query.

19. The one or more computer-storage memory of claim 18, wherein utilizing the IP address and the query log data to determine if an implicit local intent is present in the received query further comprises generating an enhanced query utilizing the at least one term having an explicit local intent, and wherein utilizing at least one of a search engine or the query log data to determine at least one local, location-specific result for the received query comprises utilizing the search engine to identify at least one frequently selected Uniform Resource Locator (URL) generated based upon the enhanced query, the at least one frequently selected URL being frequently selected upon the subsequent query being received from users having computing devices associated with IP addresses associated with the geographic region.

20. The one or more computer-storage memory of claim 18, wherein the at least one term having an explicit local intent comprises at least one term indicative of at least one of a geographical location, a business, a tourist attraction, or a local area at or near the geographic region.

* * * * *